(12) United States Patent
Huddersman et al.

(10) Patent No.: US 8,410,011 B2
(45) Date of Patent: Apr. 2, 2013

(54) FIBROUS CATALYST, ITS PREPARATION AND USE THEREOF

(75) Inventors: Katherine Huddersman, Leicester (GB); Vera Ischtchenko, Leicester (GB)

(73) Assignee: De Montfort University, Leicester (GB)

( * ) Notice: Subject to any disclaimer, the term of this patent is extended or adjusted under 35 U.S.C. 154(b) by 398 days.

(21) Appl. No.: 12/224,399

(22) PCT Filed: Feb. 23, 2007

(86) PCT No.: PCT/GB2007/000612
§ 371 (c)(1),
(2), (4) Date: Nov. 7, 2008

(87) PCT Pub. No.: WO2007/099293
PCT Pub. Date: Sep. 7, 2007

(65) Prior Publication Data
US 2009/0152202 A1 Jun. 18, 2009

(30) Foreign Application Priority Data
Feb. 28, 2006 (GB) .................................. 0603986.1

(51) Int. Cl.
*B01J 31/00* (2006.01)
(52) U.S. Cl. ......... 502/159; 502/165; 502/167; 502/300
(58) Field of Classification Search .................. 210/758, 210/759, 763, 501, 503, 504, 505, 506, 507, 210/508; 502/100, 102–104, 150, 159, 162, 502/165, 167, 170, 171, 200, 207, 326, 328, 502/329, 338
See application file for complete search history.

(56) References Cited

U.S. PATENT DOCUMENTS
3,872,027 A * 3/1975 Christmann et al. .......... 502/159

FOREIGN PATENT DOCUMENTS
| GB | 1436245 | 5/1976 |
| GB | 2346569 | 8/2000 |
| RU | 2118908 | 6/1997 |
| RU | 2266304 | 5/2004 |

OTHER PUBLICATIONS

Ishtchenko, V. V. et al., "Part 1. Production of a Modified PAN Fibrous Catalyst and Its Optimisation Towards the Decomposition of Hydrogen Peroxide," *Applied Catalysis A: General*, vol. 242, No. 1, Mar. 20, 2003, pp. 123-137.
Ishtchenko, V. V. et al., "Investigation of the Mechanical and Physio-Chemical Properties of a Modified PAN Fibrous Catalyst," *Applied Catalysis A: General*, vol. 242, No. 2, Mar. 20, 2003, pp. 221-231.
Vitkovskaya, R. F., et al., Fibre Catalyst From Modified Polyacrylonitrile Fibres, *Fibre Chemistry*, vol. 35, No. 3, 2003, pp. 202-207.
Hutcheson, Ryan et al., "A Hypothesis for the Basis of the Pro-Oxidant Nature of Calcium Ions," BioMetals 17: 605-613, 2004.

* cited by examiner

*Primary Examiner* — Lucas Stelling
(74) *Attorney, Agent, or Firm* — McDermott Will & Emery LLP

(57) ABSTRACT

The present invention relates to novel methods for preparing fibrous catalysts, to fibrous catalysts, to catalysts systems and to uses of the fibrous catalysts in the treatment of a waste stream. The method comprising the steps of: (i) treating a fabric comprising polyacrylonitrile fibers with a hydrazine salt and a hydroxylamine salt in the presence of a base to provide a modified fabric; (ii) treating the modified fabric with a base; and (iii) treating the modified fabric with an aqueous solution comprising a salt of a transition metal cation and a salt of a non-transition metal cation. The transition metal cation is selected from a scandium, titanium, vanadium, chromium, manganese, iron, cobalt, nickel and copper cation, and mixtures thereof; the non-transition metal cation is selected from a calcium, magnesium, lithium and zinc cation, and mixtures thereof.

18 Claims, No Drawings

FIBROUS CATALYST, ITS PREPARATION AND USE THEREOF

CROSS-REFERENCE TO RELATED APPLICATIONS

This application claims priority from International Patent Application No. PCT/GB2007/000612, filed Feb. 23, 2007, which claims priority to British Patent Application No. 0603986.1, filed Feb. 28, 2006, both of which are incorporated by reference herein.

The present invention relates to novel methods for preparing fibrous catalysts, to fibrous catalysts, to catalyst systems and to uses of the fibrous catalysts in the treatment of a waste stream.

The processes conducted in many industries, such as the chemical, pharmaceutical, petroleum chemical, photo-processing, pulp, leather, agro-chemical, furniture manufacturing and textile industries, produce waste streams that contain undesired compounds, for example that may be harmful to the environment. For example, waste streams that are produced in the textile industry (for example in dyeing and finishing processes) and that are produced in the pulp and leather industries may contain undesired compounds such as sulfides, dyes, phenols, nonylphenols and other organic compounds. Waste streams that are produced in the photo-processing industry may contain undesired compounds such as amines, aminophenols, phenylenediamines, triethanolamine, ethylenediaminetetraacetic acid and other organic compounds. It is advantageous to treat these waste streams, so as to substantially remove the undesired compounds before further treatment and/or disposal or use.

Undesired organic compounds, such as those discussed above, may substantially be removed from waste streams by oxidative decomposition. This converts the undesired organic compound(s) into derivatives of these compounds which may then be more easily disposed of or, if appropriate, isolated and collected for use elsewhere.

The oxidative decomposition of an organic compound may be conducted by reaction with a transition metal cation and an oxidant, such as hydrogen peroxide or oxygen. This reaction is known as "Fentons chemistry" (see, for example, Advanced Inorganic Chemistry, Cotton, Wilkinson, Murrillo and Bochmann, John Wiley and Sons, 1999, $6^{th}$ edition, pages 458 and 459). Any transition metal cation that can easily undergo redox reaction to another oxidation state can participate in the Fentons chemistry reaction. For example, when the transition metal is iron, the iron cation $Fe^{2+}$ may react with hydrogen peroxide and be oxidized to form the $Fe^{3+}$ cation as well as a hydroxide anion and a hydroxyl radical. The hydroxyl radical can then act as an oxidizing agent, for example to oxidize an organic compound. Non-transition metal cations cannot participate in the Fentons chemistry reaction because they have only one oxidation state.

The source of transition metal cations for use in such an oxidative decomposition reaction may be in the form of a homogeneous catalyst. The homogeneous catalyst typically comprises a transition metal salt or complex. However, the use of a homogeneous catalyst to treat waste streams has some disadvantages. For example, the homogeneous catalyst cannot be regenerated or recycled for further use. Additionally, the homogeneous catalyst introduces the transition metal(s) into the waste streams. This is undesirable because transition metals typically are toxic and potentially harmful to the environment. Thus, the transition metal(s) must be removed from the treated waste stream before further processing or disposal, which is costly, time consuming and difficult to perform.

It was suggested that these problems could be overcome by using a heterogeneous catalyst instead of a homogeneous catalyst. When a heterogeneous catalyst is used, only negligible amounts of metal are released into the waste stream and the catalyst can be regenerated or recycled for further use. However, reactions involving heterogeneous catalysts often are slow and difficult to regulate. This is because heterogeneous catalysts typically exist in a granulated form, which forms a packed bed or layer of the catalyst. This makes it difficult to pass a waste stream through the catalyst and limits access to the active sites of the catalyst.

It was then suggested to use fibrous catalysts to overcome the disadvantages associated with heterogeneous catalysts. Fibrous catalysts are catalysts comprised of polymer fibres to which catalytically active sites or centres are attached. Fibrous catalysts have an increased exterior surface area compared to granulated heterogeneous catalysts, which improves access of the reactant substances to the catalyst active sites and improves the catalytic activity. The more accessible structure of the fibrous catalysts also makes it easier to pass a waste stream through the catalyst. Furthermore, fibrous catalysts are strong and can be made into woven and nonwoven forms suitable for being installed into different devices. Fibrous catalysts also are inexpensive to make, can be regenerated and recycled for further use and are easy to dispose of.

GB-A-1,436,245 discloses fibrous catalysts for the oxidation of carbon monoxide and processes for preparing the catalysts. The catalysts comprise activated carbon fibres that support noble metals such as palladium, ruthenium, rhodium and platinum, or compounds thereof. GB-A-1,436,245 teaches that the catalysts it describes may be prepared by applying the metal or metal compound to pre-formed carbonisable, infusible fibres, subjecting the fibres to a carbonizing treatment to convert them to carbon fibres and then activating the carbon fibres. The carbonisable, infusible fibres may be artificial or naturally occurring fibres, for example the artificial fibres may be polyacrylonitrile fibres.

RU-A-2118908 discloses a textile fibrous bulked catalyst made in the form of a fabric including a carrier layer made from single filaments and modified ion-containing complex threads of polyacrylonitrile filaments including one or more ions of metal of variable valence.

GB-A-2,346,569 discloses methods for producing a fibrous catalyst. One method comprises the steps of treating a knitted fabric consisting of an inert filament and complex polyacrylonitrile (hereinafter referred to as "PAN") threads with a hot alkaline solution of hydrazine hydrochloride and then with an aqueous transition metal salt solution. As the skilled person would appreciate, the reference to "complex threads" means that a number of threads are twisted together, i.e. not a monofilament. Another method comprises the steps of treating a fabric comprising PAN threads with an alkaline solution of a hydrazine salt, a hydroxylamine salt and sodium nitrite and then with a solution containing at least one transition metal salt. GB-A-2,346,569 suggests that it is possible that other metal salts, such as salts of calcium and magnesium, may be used instead of the transition metal salts. However, there is no disclosure in GB-A-2,346,569 of a method of producing a fibrous catalyst that uses both a salt of a transition metal and a salt of a non-transition metal.

RU-2266304 discloses catalysts for waste water and emission gas treatment. The catalysts are prepared by treating a knitted fabric consisting of polyacrylonitrile monothreads and complex threads with a modifying solution of a chlorine-containing hydrazine salt and a chlorine-containing hydroxylamine salt and then with transition metal salts.

Whilst fibrous catalysts of the type disclosed in the prior art documents are efficient at treating waste streams, there remains a need for improved fibrous catalysts that are more efficient at removing undesired compounds from a range of waste streams and that have extended lifetimes.

According to one aspect of the present invention there is provided a method for preparing a fibrous catalyst for the treatment of a waste stream, the method comprising the steps of:

(i) treating a fabric comprising PAN fibres with a hydrazine salt and a hydroxylamine salt in the presence of a base to provide a modified fabric;

(ii) treating the modified fabric with a base; and (iii) treating the modified fabric with an aqueous solution comprising a salt of a transition metal cation and a salt of a non-transition metal cation, wherein the non-transition metal cation is selected from the main Group metals.

According to another aspect of the present invention there is provided a fibrous catalyst obtainable by the method of the present invention.

According to yet another aspect of the present invention there is provided a fibrous catalyst obtained by the method of the present invention.

The fibrous catalysts according to the present invention provide very real advantages in use when compared to the catalysts of the prior art. For example, the catalysts surprisingly provide a dramatic improvement in the duration of catalytic activity. In other words, the fibrous catalysts of the present invention have increased catalytic activity and work over a longer period of time than the prior art catalysts.

Additionally, the fibrous catalysts according to the present invention are suitable for treating a wide variety of waste streams comprising virtually any undesired organic compound(s). For example, they may be used to treat waste streams originating from the chemical, pharmaceutical, petroleum chemical, textile, pulp, leather, agro-chemical, furniture manufacturing and photo-processing industries, for example comprising virtually any undesired organic compound(s). In particular, the fibrous catalysts may be used to treat waste streams containing one or more dyes, for example waste streams containing one or more dyes and which originate from the textile or chemical industries.

For the avoidance of doubt, by the term "fibrous catalyst" we mean a catalyst that comprises polymer fibres to which catalytically active sites or centres are attached. By the term "fibres" we include both a single monofilament and a complex filament that is made up of more than one monofilament.

The references to the treatment of a waste stream are intended to refer to the conversion of an undesired, potentially harmful, "waste" compound contained in the waste stream into a new derivative that typically is at least less harmful and/or easier to dispose of. In some cases, the new derivative formed may be useful in another process and/or application and may be isolated and/or collected for further use. When this is not the case, the new derivative that is formed typically will be collected and/or disposed of in any suitable manner.

Typically, the fibrous catalysts of the present invention do not convert 100% of the "waste" compound into the new derivative. As the skilled person would appreciate, the percentage conversion will depend on a number of factors, including the particular fibrous catalyst selected and the composition of the waste stream being treated. It is expected that the fibrous catalysts of the present invention will generally convert from about 50% to about 100% by weight of the "waste" compound into the new derivative.

In step (i) of the method of the present invention, the fabric is "modified". This modification is a result of several reactions that occur between the nitrile groups of the PAN fibres and the reagents used in step (i). For example, it is believed that the nitrile groups of the PAN fibres are converted into functional groups that are able to form complexes at least with the transition metal cations.

It is believed that some of the nitrile groups of the PAN fibres react with the hydrazine salt so as to produce amino and amido groups and that some of the nitrile groups are hydrolyzed so as to produce carboxyl groups. Thus, a cross-linked, amino-amido-carboxyl ion-exchange material is formed which is able to absorb transition metal cations to form complexes at least with the transition metal cations, which complexes act as catalytic active sites.

Additionally, it is believed that some of the nitrile groups of the PAN fibres react with the hydroxylamine salt to produce amidoxime groups, which amidoxime groups are then hydrolyzed to form products having a complex structure including carboxyl and hydroxylamine acid groups as well as glutarimine and other cyclic groups. This results in a strong increase in the transition metal cation fixing strength on the PAN fibres.

As the skilled person would appreciate, any suitable hydrazine salt may be used in step (i) of the method of the present invention. For example, suitable hydrazine salts include hydrazine dihydrochloride, hydrazine monohydrochloride, hydrazine monohydrobromide, hydrazine acetate and hydrazine sulfate, and mixtures thereof (particularly hydrazine dihydrochloride). As the skilled person would appreciate, one or more hydrazine salts may be used in step (i), as appropriate.

As the skilled person would appreciate, any suitable hydroxylamine salt may be used in step (i) of the method of the present invention. For example, suitable hydroxylamine salts include hydroxylamine hydrochloride, hydroxylamine sulfate and hydroxylamine phosphate, and mixtures thereof. As the skilled person would appreciate, one or more hydroxylamine salts may be used in step (i), as appropriate.

In step (i) of the method of the present invention, the fabric comprising PAN fibres typically is treated with a solution of a hydrazine salt and a hydroxylamine salt in a suitable solvent and in the presence of a suitable base. Typically, an aqueous solution is used. The concentration of the hydrazine salt used in step (i) may be in the range of from 10 to 50 g/l, particularly in the range of from 20 to 40 g/l, more particularly about 30 g/l. The concentration of the hydroxylamine salt used in step (i) may be in the range of from 14 to 70 g/l, particularly in the range of from 30 to 55 g/l, more particularly about 42 g/l.

Any suitable base may be used in step (i) of the method of the present invention. For example, a suitable base may be selected from sodium hydroxide, potassium hydroxide and sodium carbonate (particularly sodium hydroxide). The base is used in step (i) to maintain a suitable pH, i.e. at which modification of the fabric may occur. A suitable pH is, for example, a pH in the range of from 6.5 to 12, particularly a pH in the range of from 9 to 11 and more particularly a pH of about 9.5.

The step (i) may conveniently be conducted at a temperature of greater than 80° C., particularly at a temperature in the range of from 95 to 180° C., more particularly at a temperature in the range of from 100 to 105° C., for example at a temperature of about 101 to 102° C.

The reaction of step (i) may be monitored by any suitable means, such as by infra-red spectroscopy. For example, the reduction in the intensity of or the disappearance of the nitrile peak may be monitored by infra-red spectroscopy. Typically, at least 60% of the PAN fibres are modified after reaction for about two hours under the reaction conditions discussed above for step (i).

In step (ii) of the method of the present invention, the modified fabric produced in step (i) is treated with an additional base prior to conducting step (iii). It is believed that step (ii) converts those nitrile groups that remain after step (i) into carboxyl groups, which carboxyl groups are able to absorb transition metal cations to form complexes with the transition metal cations. In other words, the fabric is further modified in step (ii). Thus, references herein to "modified fabric" are intended to refer to fabric comprising modified PAN fibres, i.e. wherein the PAN fibres have been subjected to steps (i) and/or (ii) of the method of the present invention.

As the skilled person would appreciate, any suitable base may be used in step (ii). For example, a suitable base may be selected from sodium hydroxide, potassium hydroxide and sodium carbonate (such as a sodium hydroxide solution with a concentration in the range of from 50 to 100 g/l).

The same or different base may be used in steps (i) and (ii) of the method of the present invention. The base may be used in the form of a solution, for example an aqueous solution.

The base is used in step (ii) to maintain a suitable pH, i.e. at which further modification of the fabric may occur. A suitable pH is, for example, a pH in the range of from 6.5 to 11, particularly a pH of about 9.5. Suitable treatment times for step (ii) may be in the range of from 30 seconds to 15 minutes, particularly in the range of from 30 seconds to 1 minute.

The step (ii) may conveniently be conducted at a temperature of greater than 80° C., particularly at a temperature in the range of from 95 to 180° C., more particularly at a temperature in the range of from 100 to 105° C., for example at a temperature of about 101 to 102° C.

In step (iii) of the method of the present invention, the modified fabric produced in step (ii) is treated with an aqueous solution so as to provide the fibrous catalyst. The aqueous solution typically is an aqueous metal salt solution. The aqueous solution comprises a salt of a transition metal cation and a salt of a non-transition metal cation, wherein the non-transition metal cation is selected from the main Group metals.

As the skilled person would appreciate, the aqueous solution may, in one aspect, comprise only one salt of a transition metal cation. However, in another aspect, the aqueous solution may comprise more than one salt of a transition metal cation. In other words, the aqueous metal salt solution may comprise a mixture of transition metal salts. Similarly, the aqueous solution may comprise only one salt of a non-transition metal cation or may comprise a mixture of non-transition metal salts.

Without wishing to be bound by any theory, the transition metal cation is believed to form a complex with suitable functional groups on the modified fabric, i.e. comprising the modified PAN fibres as discussed above. The method of the present invention, therefore, provides a fibrous catalyst that comprises at least one transition metal cation fixed to PAN fibres.

For the avoidance of doubt, by the term "transition metal" we mean those elements that have partly filled d or f shells as elements and/or in compounds. Thus, we mean the metals listed in the Periodic Table of Elements (according to established IUPAC nomenclature) from scandium (Sc) to copper (Cu), from yttrium (Y) to silver (Ag) and from hafnium (Hf) to gold (Au).

As the skilled person would appreciate, the particular transition metal cation(s) used depends on the composition of the waste stream being treated and on the treatment conditions applied.

In one aspect of the invention, the transition metal cation is selected from a scandium, titanium, vanadium, chromium, manganese, iron, cobalt, nickel and copper cation, and mixtures thereof. In another aspect of the invention, the transition metal cation is selected from a titanium, chromium, manganese, iron, cobalt, nickel and copper cation (particularly a chromium, manganese, iron, cobalt, nickel and copper cation), and mixtures thereof. In yet another aspect of the invention, the transition metal cation is selected from an iron (for example $Fe^{2+}$ or $Fe^{3+}$) and copper (for example $Cu^{2+}$) cation, and mixtures thereof. In yet another aspect, the transition metal cation is an iron cation (for example $Fe^{2+}$ or $Fe^{3+}$, especially $Fe^{3+}$). It is preferred to use an iron cation because iron is non-toxic and is easily disposed of after use.

As the skilled person would appreciate, the salts of the transition metal cation(s) may comprise any suitable anion. Suitable anions include, for example, chlorides, iodides, bromides, fluorides, sulfates, carboxylates, thiosulfates, thiocyanates, perchlorates, nitrates and nitrites, particularly chlorides, sulfates, nitrates and nitrites, more particularly chlorides and sulfates, even more particularly chlorides. Thus, examples of suitable transition metal salts include $FeCl_3.6H_2O$, $CuCl_2.2H_2O$ and $CuSO_4.5H_2O$.

For the avoidance of doubt, by the term "main Group metals", we mean the metals belonging to Groups 1, 2, 12, 13, 14 and 15 as set out in the Periodic Table of Elements (according to established IUPAC nomenclature), i.e. lithium (Li), sodium (Na), potassium (K), rubidium (Rb), cesium (Cs), beryllium (Be), magnesium (Mg), calcium (Ca), strontium (Sr), barium (Ba), zinc (Zn), cadmium (Cd), mercury (Hg), aluminum (Al), gallium (Ga), indium (In), thallium (Tl), tin (Sn), lead (Pb), antimony (Sb) and bismuth (Bi).

In one aspect of the invention, the non-transition metal cation is selected from a lithium ($Li^+$), magnesium ($Mg^{2+}$), calcium ($Ca^{2+}$) and zinc ($Zn^{2+}$) cation, and mixtures thereof.

Without wishing to be bound by any theory, it is believed that the non-transition metal cations act as facilitators to fix or complex the transition metal cations to the modified PAN fibres. Typically, the non-transition metal cations are not believed to fix to the modified PAN fibres or to participate directly in the reaction(s) that treat the waste stream. However, in some cases, the non-transition metal cation(s) may fix or complex to the modified PAN fibres. For example when the non-transition metal cation is a zinc cation, it is believed that the zinc cation may fix or complex to the modified PAN fibres.

As the skilled person would appreciate, the salts of the non-transition metal cation(s) may comprise any suitable anion. Suitable anions include, for example, chlorides, iodides, bromides, fluorides, sulfates, carboxylates, thiosulfates, thiocyanates, perchlorates, nitrates and nitrites, particularly chlorides, sulfates, nitrates and nitrites, more particularly nitrates and sulfates. Thus, examples of suitable non-transition metal salts include $Ca(NO_3)_2.4H_2O$, $Mg(NO_3)_2.6H_2O$, $Li_2SO_4.H_2O$ and $ZnSO_4.7H_2O$.

The total metal cation concentration in the aqueous solution may be in the range of from 0.5 g/100 ml to 10 g/100 ml.

In the aqueous solution, the weight ratio of the transition metal salt to the non-transition metal salt may be in the range of from 1:2 to 1:6, particularly in the range of from 1:3 to 1:6.

The step (iii) may conveniently be conducted at ambient temperature, i.e. a temperature in the range of from 10 to 30° C., particularly in the range of from 20 to 30° C., for example about 25° C.

The reaction of step (iii) may be monitored by any suitable means, for example by atomic absorption spectroscopy. For example, the uptake of transition metal cation by the modified PAN fibres may be monitored by atomic absorption spectroscopy. Typically, the reaction of step (iii) is complete after about three hours under the reaction conditions discussed above for step (iii).

Typically, the fabric is washed between each of the steps (i) to (iii) of the method of the present invention. For example, the fabric may be washed with water, for example with distilled water. The washing step substantially removes residual reagents present from the previous reaction step(s).

Typically, after step (iii), the fibrous catalyst is dried before use. The catalyst may be dried using any conventional means, for example at temperatures up to 105° C.

Any fabric comprising PAN fibres may be used in the present invention. In one aspect of the invention, the fabric that comprises PAN fibres is a knitted fabric, such as a fibrous knitted mesh. Thus, in this aspect, the PAN fibres must be capable of being knitted.

The knitted fabric may be prepared by any suitable method known in the art. For example, the fabric may be knitted using conventional equipment using the "polufang" (half-cardigan structure) knitting method, which method is identifiable by British Standard 5441:1998 and would be well known to a person skilled in the art.

The PAN fibres may be complex PAN fibres and may be prepared by any suitable method known to a person skilled in the art. For example, the PAN fibres may be prepared according to Russian Standard 6-0602-80.

The fabric may comprise one or more inert mono-fibres in addition to the PAN fibres. The inert mono-fibres preferably should be capable of being knitted and act as a support for the PAN fibres, so as to provide a fibrous catalyst that is self-supporting. Without wishing to be bound by any theory, the inert mono-fibres are not believed to participate directly in the reaction(s) that treat the waste stream.

The inert mono-fibres may be any suitable fibres known to a person skilled in the art. For example, suitable inert mono-fibres include polypropylene fibres (such as polypropylene fibres made according to Russian Standard 6-06-537-87).

When the knitted fabric comprises one or more inert mono-fibres, any suitable weight ratio of PAN fibres to inert mono-fibres may be used. It is preferred that the knitted fabric comprises a higher proportion of PAN fibres than inert mono-fibres. This is because the inert mono-fibres are not believed to participate in the reaction(s) that treat the waste stream. For example, the knitted fabric may comprise the PAN fibres and the inert mono-fibres in a weight ratio in the range of from 90:10 to 10:90, particularly 75:25 to 25:75 and more particularly 60:40 to 40:60.

According to another aspect of the present invention there is provided a fibrous catalyst for the treatment of a waste stream, the fibrous catalyst comprising:
(i) a fabric comprising polyacrylonitrile (PAN) fibres;
(ii) a transition metal cation fixed to the PAN fibres; and
(iii) a zinc cation fixed to the PAN fibres.

In this aspect, the fabric, PAN fibres and transition metal cation are as defined above in relation to the method of the present invention. This fibrous catalyst may be prepared using any suitable method, for example using a method as hereinbefore defined, wherein at least one of the non-transition metal cations is a zinc cation.

As discussed above, it is believed that the transition metal cation and the zinc cation each form a complex with suitable functional groups on the PAN fibres. Thus, by the term "fixed" we mean that the cations are complexed to the PAN fibres. The PAN fibres to which the cations are complexed are modified PAN fibres, for example as hereinbefore described.

According to another aspect of the invention, there is provided a catalyst system for providing a fibrous catalyst for the treatment of a waste stream, the catalyst system comprising:
(i) polyacrylonitrile fibres;
(ii) a hydrazine salt;
(iii) a hydroxylamine salt;
(iv) a base;
(v) a salt of a transition metal cation; and
(vi) a salt of a non-transition metal cation, wherein the non-transition metal cation is selected from the main Group metals.

In this aspect, the PAN fibres, hydrazine salt, hydroxylamine salt, base, salt of a transition metal cation and salt of a non-transition metal cation are as defined above in relation to the method of the present invention. The base is selected so as to provide the desired pH for each step of the method, as necessary.

The catalyst system includes those components that are required to provide a fibrous catalyst for the treatment of a waste stream. The fibrous catalysts may be prepared using any suitable method, for example using a method as hereinbefore defined.

According to another aspect of the present invention, there is provided the use of a fibrous catalyst as hereinbefore defined in the treatment of a waste stream. The waste stream may comprise one or more organic compounds, such as one or more organic compounds selected from sulfides, thiols, dyes, phenols (including bisphenols, nonylphenols and aminophenols), amines, phenylenediamines, triethanol amine, ethylenediamine and tetraacetic acid (for example one or more organic compounds selected from sulfides, dyes, phenols, nonylphenols, aminophenols, amines, phenylenediamines, triethanol amine, ethylenediamine and tetraacetic acid). The fibrous catalyst typically is used in the presence of an oxidant.

According to another aspect of the present invention, there is provided a method of treating a waste stream, the method comprising contacting the waste stream with a fibrous catalyst as hereinbefore defined in the presence of an oxidant. The waste stream may comprise one or more organic compounds, such as one or more organic compounds selected from sulfides, thiols, dyes, phenols (including bisphenols, nonylphenols and aminophenols), amines, phenylenediamines, triethanol amine, ethylenediamine and tetraacetic acid (for example one or more organic compounds selected from sulfides, dyes, phenols, nonylphenols, aminophenols, amines, phenylenediamines, triethanol amine, ethylenediamine and tetraacetic acid).

Any suitable oxidant may be used in the use/method of the present invention. Suitable oxidants include oxygen, ozone and hydrogen peroxide. Typically, it is sufficient to contact the waste stream with the fibrous catalyst in air, with the oxygen in the air acting as the oxidant. The oxidant may be delivered using any suitable means. The particular means of delivering the oxidant will depend on the waste stream being treated and the conditions applied. For example, the oxidant may be delivered by bubbling air or oxygen through the waste stream.

The use/method of the present invention may be conducted under any suitable conditions, such as any suitable temperature and pH. As the skilled person would appreciate, the preferred conditions for a particular use/method will depend on a number of factors, such as the particular waste stream being treated and the fibrous catalyst used. Typically, a preferred pH is in the range of from 2 to 12.

Typically, the waste stream is in the form of a fluid, which may be liquid or gaseous. In one aspect of the invention, the waste stream is in the liquid phase. For example, the liquid waste stream may be aqueous or organic based.

The waste stream may originate from any relevant process or industry, for example the waste stream may originate from the chemical, pharmaceutical, petroleum chemical, agrochemical, textile, pulp, leather, furniture manufacturing or photo-processing industry, particularly from the textile or photo-processing industry.

Examples of dyes that may be treated using the fibrous catalyst of the present invention include anthraquinone dyes, such as Acid Blue 45 and Natural Red 4, and azo dyes, such as Cetacid red 4G.

Examples of phenol compounds that may be treated using the fibrous catalyst of the present invention include nonylphenol (for example 4-nonylphenol), as well as bisphenols (for example bisphenol A).

Examples of sulfide compounds that may be treated using the fibrous catalyst of the present invention include dialkylsulfides (for example diethylsulfide).

Examples of thiol compounds that may be treated using the fibrous catalyst of the present invention include alkylthiols (for example butylmercaptan).

The invention will now be illustrated by the following non-limiting examples in which, unless stated otherwise:
(a) temperatures are given in degrees Celsius (° C.);
(b) operations were conducted at room or ambient temperature, that is a temperature in the range of from 18 to 25° C.;
(c) chemical symbols have their usual meanings;
(d) Si symbols and units are used; and
(e) Ultra-violet/Visible spectra were recorded on a UNICAM UV2-100 spectrophotometer.

Preparation of the Catalyst

The fabric was knitted in the same way as reported in GB-A-2,346,569.

The fibrous knitted mesh consisting of polyacrylonitrile (PAN) complex fibres and polypropylene (PP) inert monofibres was modified in a three-stage process.

At the first treatment stage, 30 g of fabric was immersed into an autoclave containing 800 ml of an aqueous solution of 30 g/l hydrazine dihydrochloride, 42 g/l hydroxylamine monohydrochloride and sodium hydroxide in the amount required for a pH of 9.5. The fabric was maintained at a temperature of from 101 to 102° C. for 2 hours, then it was taken out and washed with distilled water.

At the second treatment stage, the fabric was treated for 30 seconds with boiling aqueous NaOH solution having a concentration of 50 g/l followed by subsequent washing with distilled water. The ratio of the solution mass and knitted mesh mass was equal to 800 ml/30 g.

At the third treatment stage, the fabric (30 g) was immersed into 1050 ml of an aqueous metal salt solution of $FeCl_3.6H_2O$ or $CuSO_4.5H_2O$ or metal salts solution containing $FeCl_3.6H_2O$ or $CuCl_2.2H_2O$ and either $Ca(NO_3)_2.4H_2O$, $Mg(NO_3)_2.6H_2O$, $Li_2SO_4.H_2O$ or $ZnSO_4.7H_2O$ for 19 hours. The catalyst was then ready to use after washing with distilled water and drying at room temperature.

Catalytic Activity

Comparative Examples 1 to 6 and Examples 1 to 13 relate to dynamic reactions, whereas Examples 14 to 37 relate to static reactions.

In Comparative Examples 1 to 6 and Examples 1 to 11, 13 and 37, the concentration of dye solution both before and after the catalysis reaction was determined by UV/VIS spectroscopy, using a Unicam UV2-100 spectrophotometer at the maximum wavelength for each dye (acid Blue 45 λmax 594 nm, carminic acid λmax 495 nm and cetacid red 2G λmax 532 nm). Calibration was over the range of 0.5-75 mg/l. Sample volumes of 2 ml were removed and analyzed.

In Example 12, the concentration of phenol both before and after the catalysis reaction was determined using high-performance liquid chromatography (HPLC), using a Waters 510 HPLC pump with a sample loop of 20 µl and a Waters 481 UV detector (phenol λmax 270 nm). The eluent (70% methanol and 30% double distilled water by volume) was degassed by helium sparging and passed through the column at a flow rate of 0.8 ml/min. A HYPERSIL C18 column with the size of 150*4.6 mm, 5 µm was used.

In Examples 14 to 28, the concentration of Bisphenol A and nonylphenol solution both before and after the catalysis reaction was determined by high-performance liquid chromatography (HPLC), using a Waters 510 HPLC pump with a sample loop of 20 µl and a Waters 481 UV detector. For Bisphenol A, the eluent (60% methanol and 40% double distilled water by volume) was degassed by helium sparging and passed through the column at a flow rate of 0.8 ml/min. A HYPERSIL C18 column with the size of 150*4.6 mm, 5 µm was used. For Bisphenol A, the detecting wavelength was set at 280 nm. For nonylphenol a mobile phase of 90% acetonitrile and 10% water and a Sherisorb5ODS2 column (25×4.60 mm) were used. Flow rate 1 ml/min, column pressure 1 psi and UV detection at 278 nm.

In Examples 29 to 33, the concentration of butyl mercaptan or diethyl sulphide solution both before and after the catalysis reaction was determined by gas chromatography (GC), using a Perkin Elmer 8420 capillary gas chromatograph equipped with a Flame ionization Detector. Helium at 0.9 ml/min was used as carrier gas. The oven temperature was programmed at 60° C. (isothermal) for 1-butyl mercaptan and diethyl sulphide. The split ratio of all injections was 30:1. The capillary column was a ZB-5ms W/Guardian, 5% Polysilarylene, 95% Polydimethylsiloxane purchased from Phenomenex, length 30 meters, 0.125 I.D mm, 0.25 µm film thickness. An aqueous sample 0.5 µl (butyl mercaptan) or 0.3 µl (diethylsulphide) of the sulphur compound was directly injected into the GC using a 1 µl liquid syringe (Phenomenex).

In Examples 34 to 36, the concentration of sulphide solution both before and after the catalysis reaction was determined using a sulphide ion selective electrode (Elite), with sulphide ion calibrations carried out using stock solutions of 5, 50 and 500 ppm at pH 14 using the method of Balasubramanian and Pugalenthi, Water Research, 34(17), 2000, pp. 4201-4206.

COMPARATIVE EXAMPLES 1 to 6

Comparative Examples 1 to 6 demonstrate the catalytic decomposition of the anthraquinone dye Acid Blue 45 in a model waste water solution in the presence of a fibrous catalyst prepared by impregnation in a metal salt solution containing $Fe^{3+}$ cations only.

The model waste water solution was continuously fed in dynamic mode into a glass reactor vessel of a volume of 24 ml containing 2 g of the fibrous catalyst. The reaction vessel had means for air to be bubbled up through the feed solution.

The model waste water solution contained 10 mg/l of the dye, sufficient hydrochloric acid to maintain the acid medium at a pH of about 3 and an oxidant concentration of hydrogen peroxide equal to 50 mg/l. The air supply was bubbled through at 0.188 $m^3$/hour and the reaction solution temperature was at room temperature. The flow rate of the feed was 2 ml/minute and the duration of the oxidation process was 410 minutes.

COMPARATIVE EXAMPLE 7

Comparative Example 7 was conducted in an analogous manner to Comparative Examples 1 to 6, except that the flow rate of the feed was 10 ml/minute and the duration of the oxidation process was 110 minutes.

COMPARATIVE EXAMPLE 8

Comparative Example 8 demonstrates the catalytic decomposition of the anthraquinone dye Acid Blue 45 in a model waste water solution in the presence of a fibrous catalyst prepared by impregnation in a metal salt solution containing $Cu^{2+}$ cations only.

The model waste water solution was continuously fed in dynamic mode into a glass reactor vessel of volume 24 ml containing 2 g of the fibrous catalyst. The reaction vessel had means for air to be bubbled up through the feed solution.

The model waste water solution contained 10 mg/l of the dye, sufficient hydrochloric acid to maintain the acid medium at a pH of about 3 and an oxidant concentration of hydrogen peroxide equal to 50 mg/l. The air supply was bubbled through at 0.188 m³/hour and the reaction solution temperature was at room temperature. The flow rate of the feed was 2 ml/minute and the duration of the oxidation process was 240 minutes.

Examples 1 and 2

Examples 1 and 2 demonstrate the catalytic decomposition of the anthraquinone dye Acid Blue 45 in a model waste water solution in the presence of a fibrous catalyst prepared by treating the modified fabric with an aqueous metal salt solution containing both the $Fe^{3+}$ cation and the $Ca^{2+}$ cation.

The model waste water solution was continuously fed in dynamic mode into a glass reactor vessel of a volume of 24 ml containing 2 g of the catalyst. The reaction vessel had means for air to be bubbled up through the feed solution.

The model waste water solution contained 10 mg/l of the dye, sufficient hydrochloric acid to maintain the acid medium at a pH of about 3 and an oxidant concentration of hydrogen peroxide equal to 50 mg/l. The air supply was bubbled through at 0.188 m³/hour and the reaction solution temperature was at room temperature. The flow rate of the feed was 10 ml/minute and the duration of the oxidation process was 110 minutes.

Example 3

Example 3 was conducted in an analogous manner to Examples 1 and 2, except that the flow rate of the feed was 2 ml/min and the duration of the oxidation process was 650 minutes.

Example 4

Example 4 was conducted in an analogous manner to Example 3, except that the duration of the oxidation process was 1250 minutes.

Example 5

Example 5 was conducted in an analogous manner to Example 3, except that the duration of the oxidation process was 1300 minutes.

Example 6

Example 6 demonstrates the catalytic decomposition of the anthraquinone dye Acid Blue 45 in a model waste water solution in the presence of a fibrous catalyst prepared by treating the modified fabric with an aqueous metal salt solution containing both the $Fe^{3+}$ cation and the $Mg^{2+}$ cation.

The model waste water solution was continuously fed in dynamic mode into a glass reactor vessel of a volume of 24 ml containing 2 g of the catalyst. The reaction vessel had means for air to be bubbled up through the feed solution.

The model waste water solution contained 10 mg/l of the dye, sufficient hydrochloric acid to maintain the acid medium at a pH of about 3 and an oxidant concentration of hydrogen peroxide equal to 50 mg/l. The air supply was bubbled through at 0.188 m³/hour and the reaction solution temperature was at room temperature. The flow rate of the feed was 2 ml/minute and the duration of the oxidation process was 1130 minutes.

Example 7

Example 7 demonstrates the catalytic decomposition of the anthraquinone dye Acid Blue 45 in a model waste water solution in the presence of a fibrous catalyst prepared by treating the modified fabric with an aqueous metal salt solution containing both the $Fe^{3+}$ cation and the $Li^+$ cation The model waste water solution was continuously fed in dynamic mode into a glass reactor vessel of a volume of 24 ml containing 2 g of the catalyst. The reaction vessel had means for air to be bubbled up through the feed solution.

The model waste water solution contained 10 mg/l of the dye, sufficient hydrochloric acid to maintain the acid medium at a pH of about 3 and an oxidant concentration of hydrogen peroxide equal to 50 mg/l. The air supply was bubbled through at 0.188 m³/hour and the reaction solution temperature was at room temperature. The flow rate of the feed was 2 ml/minute and the duration of the oxidation process was 850 minutes.

Example 8

Example 8 was conducted in an analogous manner to Example 7, except that the aqueous metal salt solution contained both the $Fe^{3+}$ cation and the $Zn^{2+}$ cation and the duration of the oxidation process was 770 minutes.

Example 9

Example 9 demonstrates the catalytic decomposition of the anthraquinone dye Acid Blue 45 in a model waste water solution in the presence of a fibrous catalyst prepared by treating the modified fabric with an aqueous metal salt solution containing both the $Cu^{2+}$ cation and the $Ca^{2+}$ cation.

The model waste water solution was continuously fed in dynamic mode into a glass reactor vessel of a volume of 24 ml containing 2 g of the catalyst. The reaction vessel had means for air to be bubbled up through the feed solution.

The model waste water solution contained 10 mg/l of the dye, sufficient hydrochloric acid to maintain the acid medium at a pH of about 3 and an oxidant concentration of hydrogen peroxide equal to 50 mg/l. The air supply was bubbled through at 0.188 m³/hour and the reaction solution temperature was at room temperature. The flow rate of the feed was 2 ml/minute and the duration of the oxidation process was 240 minutes.

Example 10

Example 10 demonstrates the catalytic decomposition of the anthraquinone dye Acid Blue 45 in a model waste water solution in the presence of a fibrous catalyst prepared by treating the modified fabric with an aqueous metal salt solution containing both the $Fe^{3+}$ cation and the $Li^+$ cation.

The model waste water solution was continuously fed in dynamic mode into a glass reactor vessel of a volume of 24 ml containing 2 g of the catalyst. The reaction vessel had means for air to be bubbled up through the feed solution.

The model waste water solution contained 10 mg/l of the dye, sufficient hydrochloric acid to maintain the acid medium at a pH of about 3 and an oxidant concentration of hydrogen peroxide equal to 50 mg/l. The air supply was bubbled through at 0.188 m³/hour and the reaction solution temperature was at room temperature. The flow rate of the feed was 2 ml/minute and the duration of the oxidation process was 2900 minutes.

Example 11

Example 11 demonstrates the catalytic decomposition of the anthraquinone dye Acid Blue 45 in a model waste water solution in the presence of a fibrous catalyst prepared by treating the modified fabric with an aqueous metal salt solution containing both the $Fe^{3+}$ cation and the $Zn^{2+}$ cation.

The model waste water solution was continuously fed in dynamic mode into a glass reactor vessel of a volume of 24 ml containing 2 g of the catalyst. The reaction vessel had means for air to be bubbled up through the feed solution.

The model waste water solution contained 10 mg/l of the dye, sufficient hydrochloric acid to maintain the acid medium at a pH of about 3 and an oxidant concentration of hydrogen peroxide equal to 50 mg/l. The air supply was bubbled through at 0.12 m³/hour and the reaction solution temperature was at room temperature. The flow rate of the feed was 2 ml/minute and the duration of the oxidation process was 1640 minutes.

Example 12

Example 12 demonstrates the catalytic decomposition of phenol in a model waste water solution in the presence of a fibrous catalyst prepared by treating the modified fabric with an aqueous metal salt solution containing both the $Fe^{3+}$ cation and the $Ca^{2+}$ cation.

The model waste water solution was continuously fed in dynamic mode into a glass reactor vessel of a volume of 24 ml containing 2 g of the catalyst. The reaction vessel had means for air to be bubbled up through the feed solution.

The model waste water solution contained 22 mg/l of the phenol, sufficient hydrochloric acid to maintain the acid medium at a pH of about 3 and an oxidant concentration of hydrogen peroxide equal to 50 mg/l. The air supply was bubbled through at 0.188 m³/hour and the reaction solution temperature was at room temperature. The flow rate of the feed was 2 ml/minute and the duration of the oxidation process was 3210 minutes.

Example 13

Example 13 demonstrates the catalytic decomposition of nonylphenol in a model waste water solution in the presence of a fibrous catalyst prepared by treating the modified fabric with an aqueous metal salt solution containing both the $Fe^{3+}$ cation and the $Ca^{2+}$ cation.

The model waste water solution was continuously fed in dynamic mode into a glass reactor vessel of a volume of 24 ml containing 1 g of the catalyst. The reaction vessel had means for air to be bubbled up through the feed solution.

The model waste water solution contained 500 mg/l of the nonylphenol, 7.5% volume/volume acetonitrile to solubilise the nonylphenol, sufficient hydrochloric acid to maintain the acid medium at a pH of about 3 and an oxidant concentration of hydrogen peroxide equal to 50 mg/l. The air supply was bubbled through at 0.188 m³/hour and the reaction solution temperature was at room temperature. The flow rate of the feed was 2 ml/minute and the duration of the oxidation process, was 960 minutes.

TABLE 1

Comparative Examples 1 to 8: the catalytic oxidation processes of organic compounds using $Fe^{3+}$ or $Cu^{2+}$ fibrous catalysts

| Comparative Example | Concentration of the metal cation in solution, g/100 ml | mol·10³/100 ml | Concentration of the metal cation on the thread, mol/g·10³ | Catalytic process | Flow rate, ml/min | Time of oxidation, min | Amount of the dye oxidised, mg | TOF, hour⁻¹ |
|---|---|---|---|---|---|---|---|---|
| 1 | 0.5 ($Fe^{3+}$) | 1.85 | 0.075 | Decomposition of dye | 2 | 410 | 5.52 | 0.028 |
| 2 | 1 ($Fe^{3+}$) | 3.70 | 0.052 | Decomposition of dye | 2 | 410 | 5.26 | 0.039 |
| 3 | 5 ($Fe^{3+}$) | 18.50 | 0.039 | Decomposition of dye | 2 | 410 | 3.06 | 0.030 |
| 4 | 7 ($Fe^{3+}$) | 25.9 | 0.041 | Decomposition of dye | 2 | 410 | 3.41 | 0.032 |
| 5 | 10 ($Fe^{3+}$) | 37.0 | 0.051 | Decomposition of dye | 2 | 410 | 4.54 | 0.034 |
| 6 | 3 ($Fe^{3+}$) | 11.10 | 0.053 | Decomposition of dye | 2 | 410 | 3.43 | 0.025 |
| 7 | 3 ($Fe^{3+}$) | 11.10 | 0.053 | Decomposition of dye | 10 | 110 | 1.52 | 0.040 |
| 8 | 1.85 ($Cu^{2+}$) | 7.41 | 0.098 | Decomposition of dye | 2 | 240 | 0.86 | 0.0058 |

The dye is anthraquinone dye Acid Blue 45, [dye]=10 mg/l; [hydrogen peroxide]=50 mg/l; air supply=0.188 m³/hour; volume of the solution in the reactor=24 ml; mass of the catalyst=2 g.

The term "TOF" represents the turnover frequency. The TOF is calculated by dividing the number of moles of dye catalyzed by the number of moles of transition metal cation on the catalyst, and then dividing the result by the duration of the catalysis (in hours).

It is desirable to achieve the highest possible time of oxidation and/or the highest possible TOF.

TABLE 2

Examples 1 to 13: the catalytic oxidation processes of organic compounds using $Fe^{3+}/M^{n+}$ and $Cu^{2+}/M^{n+}$ fibrous catalysts (where M is a non-transition metal cation and n is 1 or 2)

| Example | Concentration of the metal in the solution, $mol \cdot 10^3$ (100 ml) | Concentration of the metal on the thread, $mol/g \cdot 10^3$ | Catalytic process | Flow rate, ml/min | Time of oxidation, min | Amount of the dye oxidised, mg | TOF, $hour^{-1}$ |
|---|---|---|---|---|---|---|---|
| 1 | $Fe^{3+}$ - 3.19<br>$Ca^{2+}$ - 9.50 | 0.115<br>0.000 | Decomposition of dye | 10 | 110 | 6.08 | 0.076 |
| 2 | $Fe^{3+}$ - 6.40<br>$Ca^{2+}$ - 6.40 | 0.046<br>0.000 | Decomposition of dye | 10 | 110 | 3.40 | 0.107 |
| 3 | $Fe^{3+}$ - 9.50<br>$Ca^{2+}$ - 3.19 | 0.033<br>0.000 | Decomposition of dye | 2 | 650 | 4.95 | 0.037 |
| 4 | $Fe^{3+}$ - 3.19<br>$Ca^{2+}$ - 9.50 | 0.115<br>0.000 | Decomposition of dye | 2 | 1250 | 12.97 | 0.014 |
| 5 | $Fe^{3+}$ - 6.40<br>$Ca^{2+}$ - 11.63 | 0.115<br>0.000 | Decomposition of dye | 2 | 1300 | 13.18 | 0.014 |
| 6 | $Fe^{3+}$ - 6.40<br>$Mg^{2+}$ - 12.45 | 0.115<br>0.000 | Decomposition of dye | 2 | 1130 | 12.93 | 0.016 |
| 7 | $Fe^{3+}$ - 6.40<br>$Li^{+}$ - 11.63 | 0.078<br>0.000 | Decomposition of dye | 2 | 850 | 8.04 | 0.019 |
| 8 | $Fe^{3+}$ - 6.40<br>$Zn^{2+}$ - 11.63 | 0.023<br>0.090 | Decomposition of dye | 2 | 770 | 4.07 | 0.036 |
| 9 | $Cu^{2+}$ - 2.78<br>$Ca^{2+}$ - 9.53 | 0.098<br>0.000 | Decomposition of dye | 2 | 240 | 0.82 | 0.0055 |
| 10 | $Fe^{3+}$ - 3.19<br>$Li^{+}$ - 19.0 | 0.386<br>0.000 | Decomposition of dye | 2 | 2900 | 38.2 | 0.0054 |
| 11 | $Fe^{3+}$ - 3.19<br>$Zn^{2+}$ - 9.50 | 0.294<br>0.180 | Decomposition of dye | 2 | 1640 | 25.2 | 0.0083 |
| 12 | $Fe^{3+}$ - 6.40<br>$Ca^{2+}$ - 11.63 | 0.051<br>0.000 | Decomposition of phenol | 2 | 3210 | 95.7 | 0.093 |
| 13 | $Fe^{2+}$ - 6.40<br>$Ca^{2+}$ - 9.50 | 0.115<br>0.000 | Decomposition of nonylphenol | 2 | 960 | 1139.0 | 7.03 |

The dye is anthraquinone dye Acid Blue 45, [dye]=10 mg/l; [hydrogen peroxide]=50 mg/l; [phenol]=22 mg/l; [nonylphenol]=500 mg/l; air supply for examples 1 to 10, 12 and 13=0.188 m³/hour; air supply for example 11=0.12 m³/hour, volume of the solution in the reactor=24 ml; mass of the catalyst=2 g.

It can be seen from a comparison of Tables 1 and 2 that the fibrous catalysts according to the present invention provide higher oxidation times (i.e. longer duration of catalytic activity) and/or oxidize larger amounts of dye.

Examples 14 to 19

A model waste water feed solution comprising Bisphenol A (200 ppm) and hydrogen peroxide (300 ppm) of volume 50 ml was made up in a batch reactor. 1 g of catalyst as prepared in Example 1 above (containing 0.046 mmol $Fe^{3+}$) was added. The pH of the feed solution was adjusted to pH 3 by the addition of dilute hydrochloric acid and air was bubbled into the solution at 0.188 m³/hour from the top of the open reactor. The reactor was then immersed in a water bath at the designated temperature as set out in Table 3. Samples were removed for analysis by HPLC at time intervals.

For Examples 14 to 19, the time taken for conversion of the Bisphenol A decreased as the temperature was increased.

Examples 20 to 22

Examples 20 to 22 were conducted in an analogous manner to Examples 14 to 19, except that after the end of the reaction the catalyst was removed, washed with water and placed back into the reactor with fresh feed solution as described in Example 14.

Examples 20 to 22 show that the catalyst of the present invention is suitable for re-use, for example in a number of treatment cycles.

Examples 23 to 27

Examples 23 to 27 were conducted in an analogous manner to Example 14, except that the pH of the feed solution was adjusted as designated in Table 3.

For Examples 23 to 27, the time taken for conversion of the Bisphenol A increased as the pH was increased.

Example 28

A model waste water feed solution comprising a cloudy suspension of nonylphenol (500 ppm) (made up by dissolving 0.5 mg of nonylphenol in 92.5 ml water and 7.5 ml of acetonitrile) and hydrogen peroxide (50 ppm) of volume 50 ml was made up in a batch reactor. 1 g of catalyst as prepared in Example 1 above (containing 0.046 mmol $Fe^{3+}$) was added. The pH of the feed solution was not adjusted and air was bubbled into the solution at 0.188 m³/hour from the top of the open reactor. The reactor was then immersed in a water bath at the designated temperature as set out in Table 3. Samples were removed for analysis by HPLC at time intervals and after 25 minutes the solution was clear and colorless.

For Example 28, the conversion of nonylphenol is relatively fast. Without wishing to be bound by any theory, it is believed that the destruction of the nonylphenol initially occurs at a bond that is very susceptible to oxidation, for example to produce a $C_8H_{17}O$ fragment.

Example 29

A model waste water feed solution of butyl mercaptan (200 ppm) and hydrogen peroxide (1034 ppm) of volume 50 ml was made up in a batch reactor. 1 g of catalyst as prepared in Example 1 above (containing 0.046 mmol $Fe^{3+}$) was added and the pH of the feed solution was adjusted to pH 3 by the addition of dilute hydrochloric acid. The reactor was then sealed and immersed in a water bath at the designated temperature as set out in Table 3. Samples were removed by injection through the sealing cap for analysis by GC at time intervals.

Example 30

Example 30 was conducted in an analogous manner to Example 29 except that the pH was not adjusted.

Examples 31 to 33

Examples 31 to 33 were conducted in an analogous manner to Example 29 except that diethyl sulphide (100 ppm) was used instead of butyl mercaptan, the pH was adjusted to pH 2.6 and hydrogen peroxide at concentrations 250 ppm (Example 31), 517 ppm (Example 32) and 750 ppm (Example 33) were used.

For Examples 31 to 33, the time taken for conversion of the diethyl sulphide decreased as the hydrogen peroxide concentration was increased.

Example 34

A model waste water feed solution of sodium sulphide (500 ppm) of volume 50 ml was made up in a batch reactor. 1 g of catalyst as prepared in Example 1 above (containing 0.046 mmol $Fe^{3+}$) was added. The pH of the feed solution was adjusted to pH 14 by the addition of dilute hydrochloric acid and air was bubbled into the solution at 0.188 $m^3$/hour from the top of the open reactor. The reactor was then immersed in a water bath at the designated temperature as set out in Table 3. Samples were removed for analysis by sulphide selective electrode at time intervals.

Examples 35 and 36

Examples 35 and 36 were conducted in an analogous manner to Example 34 except that after catalysis the catalyst was removed from the reactor, washed with water and a fresh feed solution was added.

Examples 35 and 36 show that the catalyst of the present invention is suitable for re-use, for example in a number of treatment cycles.

Example 37

A model waste water feed solution of Cetacid red 2G (20 ppm) and hydrogen peroxide (25 ppm) of volume 50 ml was made up in a batch reactor. 1 g of catalyst as prepared in Example 1 above (containing 0.046 mmol $Fe^{3+}$) was added. The pH of the feed solution was adjusted to pH 3 by the addition of dilute hydrochloric acid and the solution was stirred using a magnetic stirrer. Samples were removed for analysis by UV/VIS at time intervals.

TABLE 3

Examples 14 to 37: the static catalytic oxidation processes of organic compounds using a $Fe^{3+}/Ca^{2+}$ fibrous catalyst as prepared in Example 1 above

| Example | Compound | Initial concentration of compound mg/L | Hydrogen peroxide concentration mg/L | pH | Time taken for conversion min 50% | 100% |
|---|---|---|---|---|---|---|
| 14 | Bisphenol A - 20° C. | 75 | 300 | 3 | 50 | 120 |
| 15 | Bisphenol A - 30° C. | 75 | 300 | 3 | 40 | 100 |
| 16 | Bisphenol A - 40° C. | 75 | 300 | 3 | 32 | 90 |
| 17 | Bisphenol A - 50° C. | 75 | 300 | 3 | 22 | 60 |
| 18 | Bisphenol A - 60° C. | 75 | 300 | 3 | 8 | 20 |
| 19 | Bisphenol A - cycle 1/30° C. | 75 | 300 | 3 | 42 | 110 |
| 20 | Bisphenol A - cycle 2/30° C. | 75 | 300 | 3 | 52 | 120 |
| 21 | Bisphenol A - cycle 3/30° C. | 75 | 300 | 3 | 80 | 120 |
| 22 | Bisphenol A - cycle 4/30° C. | 75 | 300 | 3 | 80 | 120 |
| 23 | Bisphenol A - 30° C. | 75 | 300 | 4 | 55 | 120 |
| 24 | Bisphenol A - 30° C. | 75 | 300 | 5 | 70 | 140 |

TABLE 3-continued

Examples 14 to 37: the static catalytic oxidation processes of organic compounds using a $Fe^{3+}/Ca^{2+}$ fibrous catalyst as prepared in Example 1 above

| Example | Compound | Initial concentration of compound mg/L | Hydrogen peroxide concentration mg/L | pH | Time taken for conversion min 50% | 100% |
|---|---|---|---|---|---|---|
| 25 | Bisphenol A - 30° C. | 75 | 300 | 6 | 80 | 160 |
| 26 | Bisphenol A - 30° C. | 75 | 300 | 7 | 90 | >120 |
| 27 | Bisphenol A - 30° C. | 75 | 300 | 8 | 112 | >120 |
| 28 | 4-Nonylphenol | 500 | 50 | 6.8 | 5 | 25 |
| 29 | Butyl mercaptan | 200 | 1034 | 3 | 8 | 260 |
| 30 | Butyl mercaptan | 200 | 1034 | 7 | 6 | 70 |
| 31 | Diethyl sulphide | 100 | 250 | 2.6 | 20 | 300 |
| 32 | Diethyl sulphide | 100 | 517 | 2.6 | 20 | 140 |
| 33 | Diethyl sulphide | 100 | 750 | 2.6 | 12 | 130 |
| 34 | Sulphide anion - cycle 1 | 500 | 0 | 14 | 3 | >60 |
| 35 | Sulphide anion - cycle 2 | 500 | 0 | 14 | 3 | >60 |
| 36 | Sulphide anion - cycle 3 | 500 | 0 | 14 | 40 | >60 |
| 37 | Cetacid red 2G | 20 | 25 | 3 | 28 | >90 |

Liquor to mesh ratio of 50 ml feed solution to 1 g mesh for all examples except for Example 29 where the liquor to mesh ratio is 50 ml feed to 2.5 g mesh.

The invention claimed is:

1. A method for preparing a fibrous catalyst for the treatment of a waste stream containing an undesired compound, the method comprising the steps of;
   (i) treating a fabric comprising polyacrylonitrile fibers with a hydrazine salt and a hydroxylamine salt in the presence of a base to provide a modified fabric;
   (ii) treating the modified fabric with a base; and
   (iii) treating the modified fabric with an aqueous solution comprising an amount of a salt of a transition metal cation and a salt of a non-transition metal cation, wherein the transition metal cation is an iron cation, and the non-transition metal cation comprises a metal from Group 1, 2, 12, 13, 14, or 15 of the Periodic Table of Elements,
   wherein the resultant fibrous catalyst prepared according to steps (i) to (iii) is loaded with the transition metal cation, and is essentially free of the non-transition metal cation whereby the resultant fibrous catalyst has an enhanced transition metal cation loading and provides an enhanced catalytic activity.

2. A method according to claim 1, wherein the hydrazine salt is selected from the group consisting of hydrazine dihydrochloride, hydrazine monohydrochloride, hydrazine monohydrobromide, hydrazine acetate and hydrazine sulfate, and mixtures thereof.

3. A method according to claim 1, wherein the hydroxylamine salt is selected from the group consisting of hydroxylamine hydrochloride, hydroxylamine sulfate and hydroxylamine phosphate, and mixtures thereof.

4. A method according to claim 1, wherein step (i) is conducted at a pH in the range of from 9 to 11.

5. A method according to claim 1, wherein in step (ii) the base is selected from the group consisting of sodium hydroxide, potassium hydroxide and sodium carbonate, and mixtures thereof.

6. A method according to claim 1, wherein the non-transition metal cation is selected from the group consisting of a calcium, magnesium, and lithium cation, and mixtures thereof.

7. A method according to claim 1, wherein the fabric is a knitted fabric.

8. A method according to claim 1, wherein the fabric comprises polyacrylonitrile fibres and one or more inert monofibres.

9. A method for preparing a fibrous catalyst for the treatment of a waste stream containing an undesired compound, the method comprising the steps of:
   (i) treating a fabric comprising polyacrylonitrile fibers with a hydrazine salt and a hydroxylamine salt in the presence of a base to provide a modified fabric;
   (ii) treating the modified fabric with a base; and
   (iii) treating the modified fabric with an aqueous solution comprising an amount of a salt of a transition metal cation and a salt of a non-transition metal cation, wherein the non-transition metal cation comprises a metal from Group 1, 2, 13, 13, 14, or 15 of the Periodic Table of Elements; and
   wherein the resultant fibrous catalyst prepared according to steps (i) to (iii) is loaded with an enhanced amount of the transition metal cation, and is essentially free of the non-transition metal cation, and provides an enhanced catalytic activity.

10. A method according to claim 9, wherein the hydrazine salt is selected from the group consisting of hydrazine dihydrochloride, hydrazine monohydrochloride, hydrazine monohydrobromide, hydrazine acetate and hydrazine sulfate, and mixtures thereof.

11. A method according to claim 9, wherein the hydroxylamine salt is selected from the group consisting of hydroxylamine hydrochloride, hydroxylamine sulfate and hydroxylamine phosphate, and mixtures thereof.

12. A method according to claim 9, wherein step (i) is conducted at a pH in the range of from 9 to 11.

13. A method according to claim 9, wherein in step (ii) the base is selected from the group consisting of sodium hydroxide, potassium hydroxide and sodium carbonate, and mixtures thereof.

14. A method according to claim 9, wherein the transition metal cation is selected from the group consisting of a scandium, titanium, vanadium, chromium, manganese, iron, cobalt, nickel and copper cation, and mixtures thereof.

15. A method according to claim 14, wherein the transition metal cation is an iron cation.

16. A method according to claim 9, wherein the non-transition metal cation is selected from the group consisting of a calcium, magnesium, and lithium cation, and mixtures thereof.

17. A method according to claim 9, wherein the fabric is a knitted fabric.

18. A method according to claim 9, wherein the fabric comprises polyacrylonitrile fibres and one or more inert mono-fibres.

* * * * *